D. N. SHRUM & J. H. KELLEY.
SPOKE GAGE.
APPLICATION FILED JULY 20, 1914.

1,169,359.

Patented Jan. 25, 1916.
2 SHEETS—SHEET 1.

Witnesses

Inventor
James H. Kelley
David N. Shrum

D. N. SHRUM & J. H. KELLEY.
SPOKE GAGE.
APPLICATION FILED JULY 20, 1914.
1,169,359.
Patented Jan. 25, 1916.
2 SHEETS—SHEET 2.
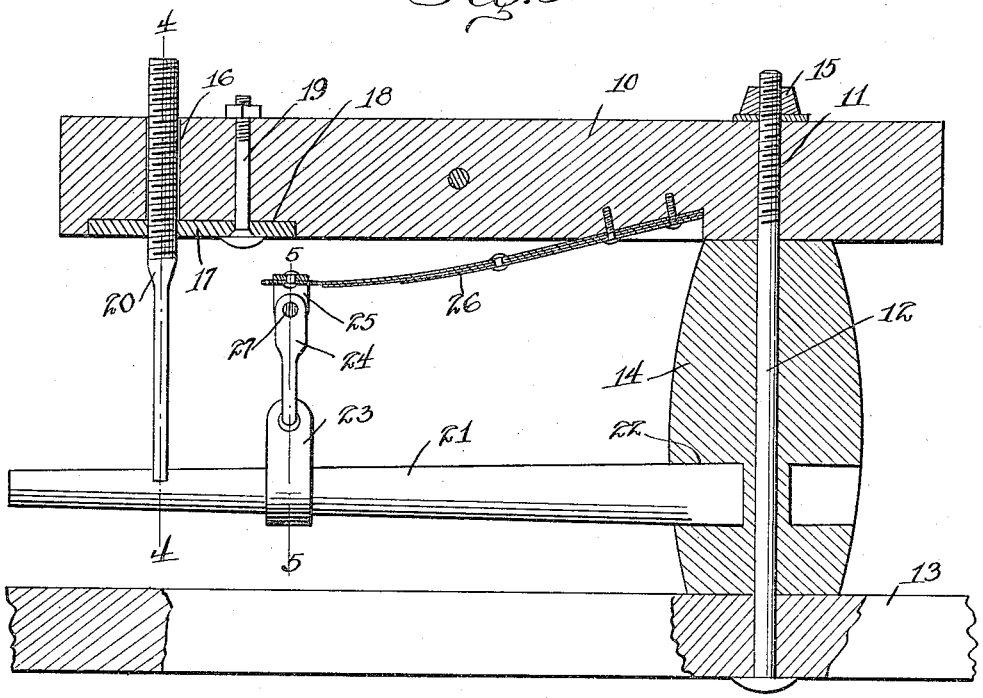
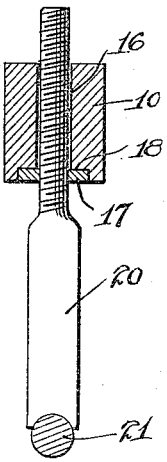
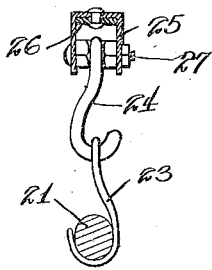
Witnesses
Wm. H. Mulligan
Ross J. Woodward
Inventor
James H. Kelley
David N. Shrum
By Richard B. Owen
Attorney

UNITED STATES PATENT OFFICE.

DAVID NEWTON SHRUM AND JAMES H. KELLEY, OF ST. JAMES, ARKANSAS.

SPOKE-GAGE.

1,169,359.  Specification of Letters Patent.  Patented Jan. 25, 1916.

Application filed July 20, 1914. Serial No. 852,037.

*To all whom it may concern:*

Be it known that we, DAVID NEWTON SHRUM and JAMES HENRY KELLEY, citizens of the United States, residing at St. James, in the county of Stone and State of Arkansas, have invented certain new and useful Improvements in Spoke-Gages, of which the following is a specification.

This invention relates to a spoke gage and the principal object of the invention is to provide an improved gage by means of which the spokes may be held in the proper position while driving the same into a hub.

Another object of the invention is to so construct the gage that it may be used in connection with hubs of varying lengths and with spokes of varying thickness.

Another object of the invention is to provide a gage which may be easily transferred from one spoke to another.

Another object of the invention is to provide a spoke gage which will be very simple in construction and very easy to operate.

This invention is illustrated in the accompanying drawings, wherein—

Figure 1:
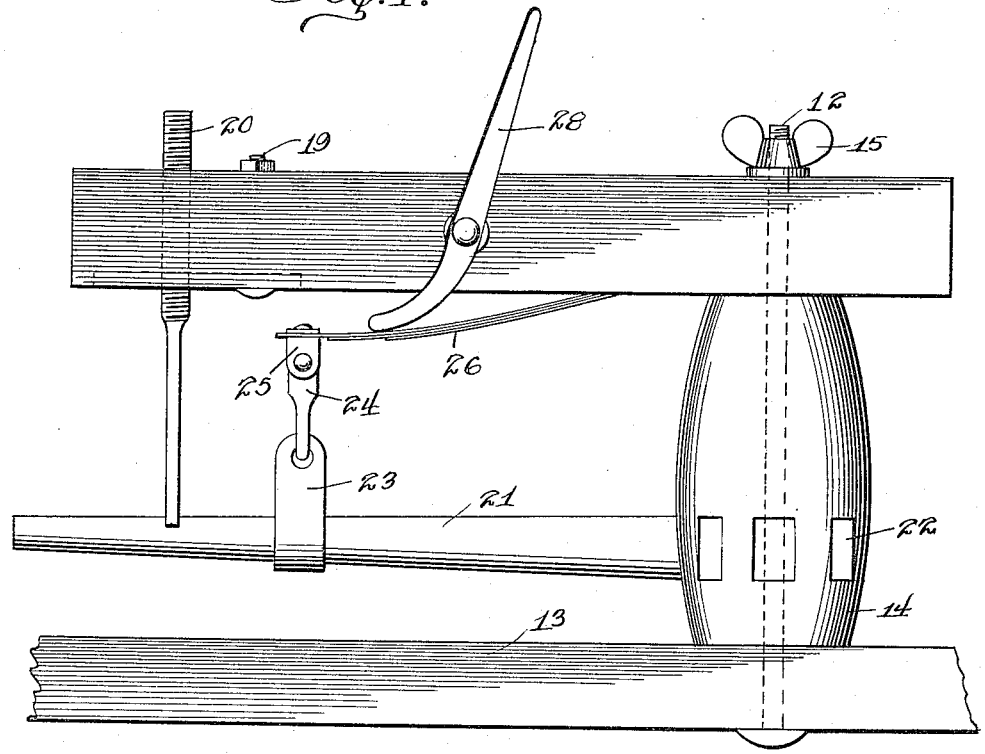
Figure 2:
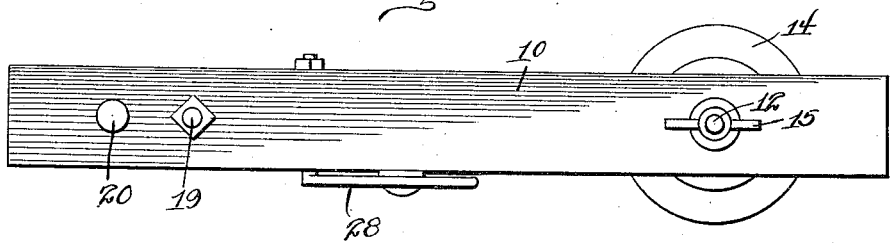

Figure 1 is a view showing the gage applied to a spoke; Fig. 2 is an end view of the gage as applied to a hub; Fig. 3 is a view showing the gage and hub in section with the spoke shown in elevation; Fig. 4 is a section taken along the line 4—4 of Fig. 3; Fig. 5 is a sectional view taken along the line 5—5 of Fig. 4.

The bar 10 forms the body portion of this gage and is provided adjacent one end with an opening 11 through which the bolt 12 passes to rotatably mount the bar 10. The bolt 12 passes through the bench 13 and after the hub 14 has been placed upon the bolt the bar 10 is placed upon the outer end of the bolt and the wing-nut 15 screwed upon the bolt to hold the bar in place.

The opposite end portion of the bar 10 is provided with an opening 16 which registers with a threaded opening formed in the metallic plate 17. This metallic plate 17 is secured in a seat 18 by means of a bolt 19, the plate 17 being provided so that the gage pin 20 may be adjustably mounted. It will thus be seen that by turning the gage pin it may be longitudinally adjusted according to the length of the hub and thickness of the spoke 21.

After the spoke 21 has been inserted in one of the sockets 22 formed in the hub, the spoke 21 is engaged by the hook 23 which is carried by the hook 24. This hook 24 is pivotally connected with the clevis 25 carried by the spring 26 by means of a pin or bolt 27. The spring 26 will draw the spoke 21 into engagement with the gage pin 20 and thus the spoke will be securely held in the proper position while driving the spoke tightly into the spoke socket. There will therefore be no danger of the spoke being broken by moving out of the desired position when struck with a mallet. After a spoke has been driven into its socket the spring can be moved by the lever 28 to permit the hook 23 to be disconnected from the spoke 21 and the hub then turned to bring a second socket into the proper position for driving a spoke therein. From an inspection of Fig. 3 it will be readily seen that the threading portion of the bolt 12 passes through the bar 10 and that therefore the bar 10 will be prevented from readily turning upon the bolt and that therefore the hub may be rotated when desired without the bar 10 turning from the desired position.

What is claimed is:—

A spoke gage comprising a body portion, a leaf spring carried by said body portion, a clevis carried by the free end portion of said leaf spring, a lever carried by said body portion and engaging said leaf spring to move the leaf spring to a releasing position, a hook pivotally connected with said clevis, a spoke engaging hook carried by said first mentioned hook, and other spoke engaging means adjustably carried by said body portion.

In testimony whereof we affix our signatures in presence of two witnesses.

DAVID NEWTON SHRUM.
JAMES H. KELLEY.

Witnesses:
NORMAN PIERCE,
EDWARD CAMPBELL.

Copies of this patent may be obtained for five cents each, by addressing the "Commissioner of Patents, Washington, D. C."